Nov. 18, 1952 — C. E. LINDEN ET AL — 2,618,180
TOOL EJECTOR
Filed June 17, 1949 — 2 SHEETS—SHEET 1
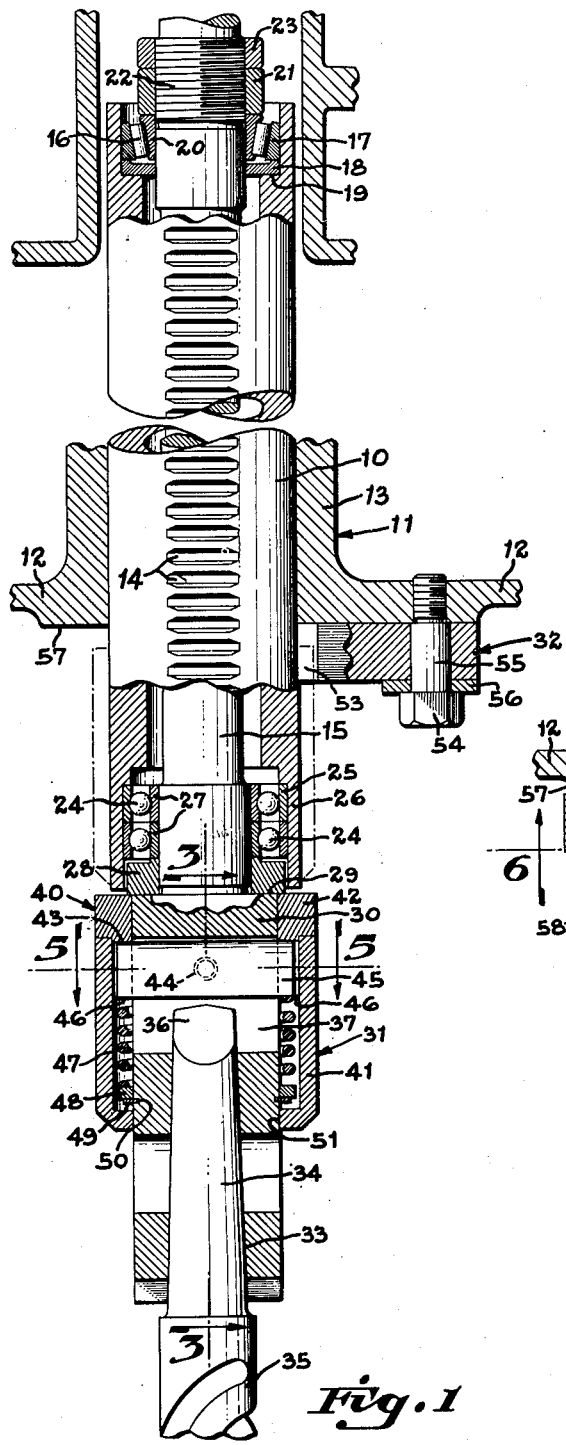
Fig. 1
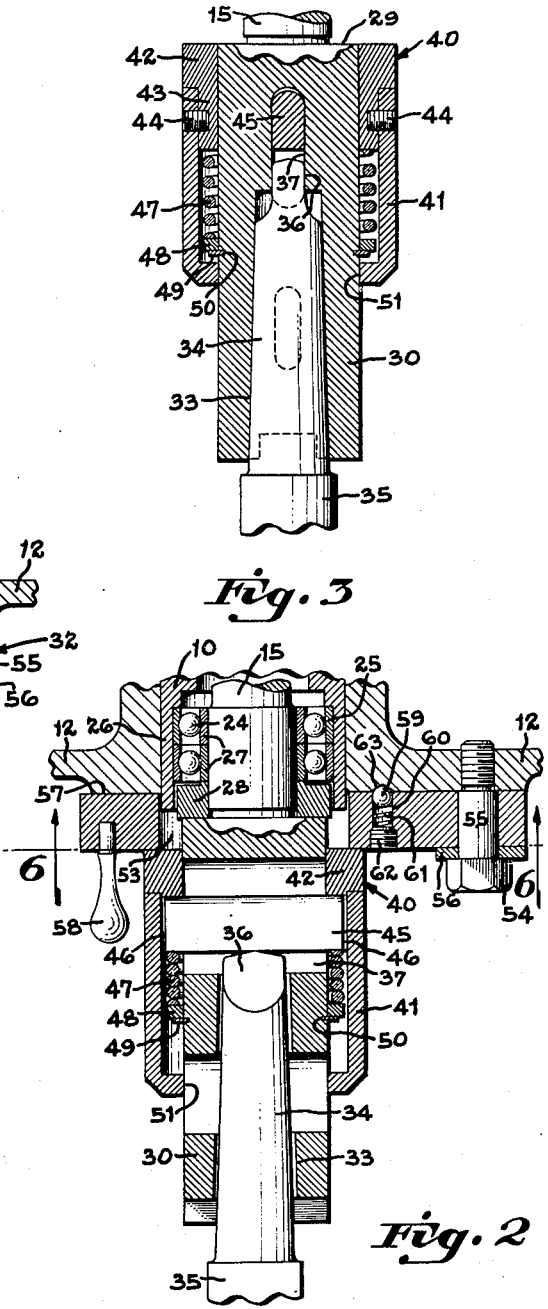
Fig. 3
Fig. 2
INVENTOR.
Carl E. Linden and
BY Frank O. Wetzel
Wood, Arey, Herron & Evans
ATTORNEYS Nov. 18, 1952     C. E. LINDEN ET AL     2,618,180
TOOL EJECTOR Filed June 17, 1949     2 SHEETS—SHEET 2

INVENTOR.
Carl E. Linden and
BY Frank O. Wetzel
Wood, Arey, Herron & Evans
ATTORNEYS Patented Nov. 18, 1952

2,618,180

UNITED STATES PATENT OFFICE 2,618,180

TOOL EJECTOR

Carl E. Linden, Cincinnati, and Frank O. Wetzel, Norwood, Ohio, assignors to The Fosdick Machine Tool Company, Cincinnati, Ohio, a corporation of Ohio Application June 17, 1949, Serial No. 99,665

2 Claims. (Cl. 77—55)

1

This invention relates generally to tool ejectors and particularly to an improved ejector for the translatable spindle of a radial drill or similar machine tool whereby the cutting tool may be dislodged by retracting the spindle. The present structure follows generally the principles disclosed in the copending application of Carl E. Linden and Frank O. Wetzel, Ser. No. 11,948 for "Tool Ejector," which discloses an ejector mounted on a drill spindle and operated by retracting the spindle to engage the ejector against a stop mounted on the drill head.

The spindle of a drilling machine such as a radial drill consists of a sleeve translatably mounted in the drill head, with a rotatable spindle journalled in the sleeve. The lower end of the spindle includes a chuck having a tapered bore to engage frictionally a drill, tap or other tool having a correspondingly tapered shank. In the absence of an ejector, the standard practice is to dislodge the tool by driving a tapered drift bar through a cross slot formed in the chuck to wedge the tool downwardly and release its frictional engagement in the tapered bore.

The principal objects of the invention have been to provide an ejector of simplified, sturdy construction for low cost fabrication and increased durability, and to provide a structure which can be assembled in a simple manner upon a standardized chuck whereby the same basic chuck may be used interchangeably either with or without an ejector.

Briefly, the structure constitutes an ejector sleeve which is slidably mounted upon the chuck, the sleeve including an ejector bar which extends through a cross slot which ordinarily may serve the drift bar, the ejector bar being sustained in position to engage the tip of a tool shank. The drill head includes a shiftable ejector or knock-out arm arranged to abut the upper end of the ejector sleeve to cause the sleeve and ejector bar to be depressed relative to the chuck to dislodge the tool when the spindle is retracted. When the arm is in an inoperative position, the spindle may be retracted to its upper limit of travel without actuating the ejector sleeve so that the tool cannot be dislodged accidentally.

The chuck is of cylindrical form, preferably including an integral drive shaft, there being provided in the lower end of the chuck a tapered bore for the tool shank and a transverse slot for the ejector bar. The ejector sleeve is of two-piece construction, constituting a separable head and a skirt to facilitate assembly. A spring for maintaining the sleeve and ejector bar in elevated

2 position has its lower end seated upon an expansible washer or snap ring which is engaged in a groove machined in the outside diameter of the chuck.

The ejector is installed most conveniently before the chuck is mounted in the spindle sleeve. In this case the parts can be slipped endwisely upon both the lower end and the spindle end of the chuck; however, by virtue of its separable construction, the unit can also be installed upon existing machines without removal of the chuck from the sleeve, simply by slipping the parts in proper sequence upon the lower end of the chuck.

In assembling the ejector upon the chuck, before the chuck is mounted in the spindle sleeve, the ejector bar and compression spring are installed, with the spring preloaded between the snap ring and ejector bar. The head portion of the ejector sleeve ring then is slipped upon the upper end of the chuck, the opposite ends of the ejector bar being engaged by slots formed in the head portion, and the skirt portion is slipped upon the chuck from the opposite end and telescopically fitted to the head portion, with the compression spring and ejector bar enclosed within the skirt.

The diameter of the assembled ejector sleeve is greater than the diameter of the spindle sleeve to form a shoulder for engagement by the ejector arm when the arm is placed in operative position. The sectional sleeve construction simplifies the assembly of the unit and provides a housing for the spring and bar and forms an extremely rugged structure by which the ejecting force is transmitted to the tool.

Further advantages of the invention will be more fully set forth in the detailed description taken in conjunction with the drawings.

In the drawings:

Figure 1 is a fragmentary sectional view of a spindle assembly associated with a drill head and incorporating the improved tool ejector, the spindle being shown in its normal position with the stop mechanism retracted to prevent accidental ejection of the tool when the spindle is retracted.

Figure 2 is a fragmentary view similar to Figure 1, with the ejector lever in operative position, the ejector sleeve being engaged against and shifted by the lever to its tool ejecting position.

Figure 3 is a fragmentary sectional view taken on line 3—3, Figure 1, further detailing the structural details of the ejector.

Figure 6:
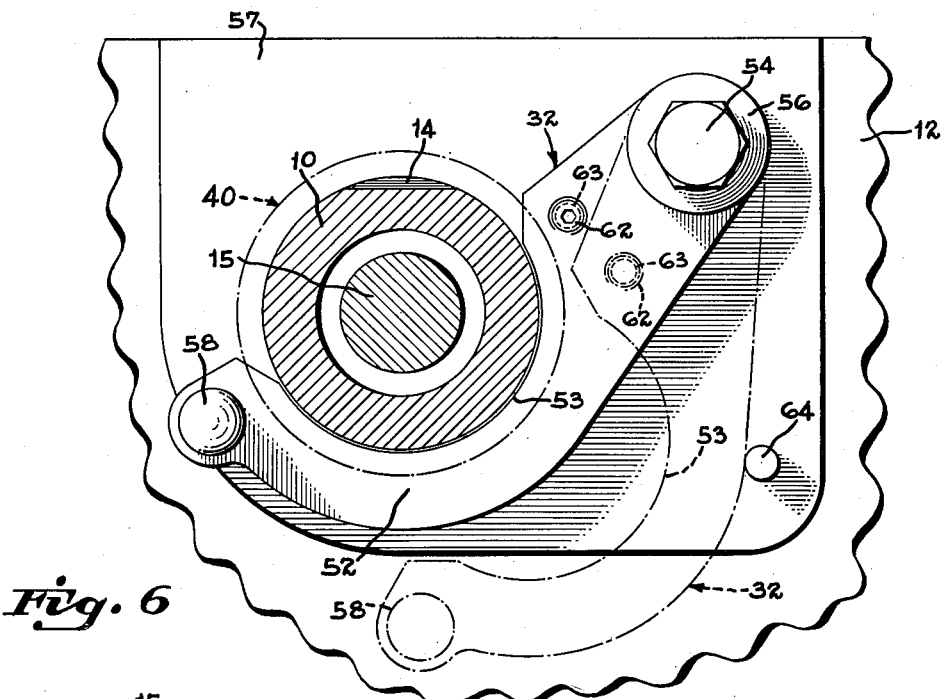
Figure 6 is a sectional view taken on line 6—6, Figure 2, illustrating the ejector lever in operating position relative to the spindle, its inoperative position being shown in broken lines.
Figures 4, 5:
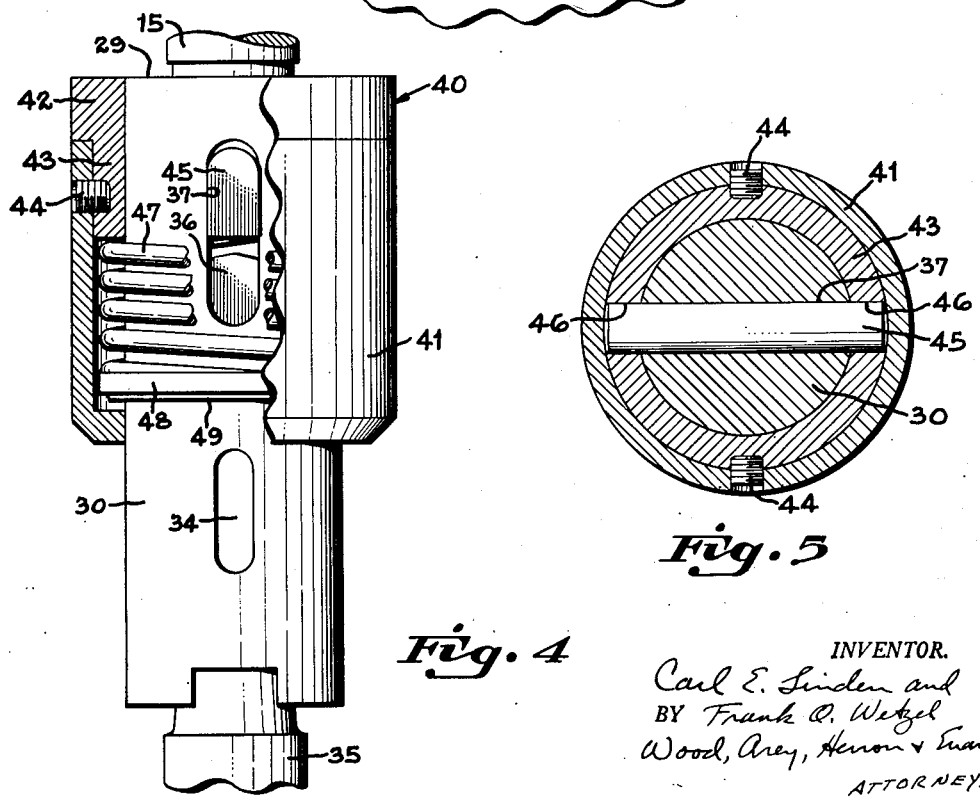
Figure 4 is an enlarged side elevation of the chuck with the ejector sleeve assembly partially broken away to illustrate more fully the relationship of the parts.
Figure 5 is a sectional view taken on line 5—5, Figure 1, further detailing the ejector sleeve construction.

Since the present improvements relate primarily to the ejector mechanism, the disclosure is limited to the translatable spindle sleeve or quill, its relationship with the drill head, and the drill spindle and ejector. As illustrated in Figure 1, the spindle sleeve 10 is slidably mounted in a drill head 11 having a bottom wall 12, which includes a boss 13 for guiding the sleeve. The sleeve and drill head may represent any one of several types of machines, the structure illustrated being a part of a radial drill head. To translate the spindle assembly relative to the head, sleeve 10 includes rack teeth 14 engaged by a rack gear (not shown) which is rotated selectively by power or by a hand lever for feeding the spindle assembly relative to the work. The spindle assembly is retracted to tool ejecting position preferably by operation of the hand lever.

The drill spindle 15 is rotatably journalled within the sleeve 10 upon bearings located at the upper and lower ends of the sleeve, the sleeve itself being non-rotatable and the spindle being driven in the usual manner by a transmission system (not shown). The upper end of the spindle is journalled in a tapered roller bearing 16 having an outer race 17 engaged by a thrust washer 18 seated against a shoulder 19 formed by counterboring the inside diameter of the spindle sleeve. The inner race 20 is engaged by a nut 21 screwed upon a threaded portion 22 of the spindle such that bearing clearance can be adjusted by tightening the nut 21. The assembly is locked in adjusted position by tightening the lock nut 23 against nut 21.

The lower end of the spindle is journalled by a pair of ball bearings 24—24, slipped upon the spindle. The outer race 25 of one of these bearings is seated against a shoulder 26 formed by counter-boring the lower end of the spindle sleeve, the inner race 27 of the other bearing being engaged by a collar 28 having its lower end seated against a shoulder 29, formed by the chuck 30, preferably an integral part of the spindle. By this arrangement the spindle is held against endwise movement by the engagement of nut 21 against the upper roller bearing 16 which adjusts the bearing clearance for both the upper and lower bearings. The spindle thus is translated longitudinally as a unit with the spindle sleeve, the end thrust developed by the drill being absorbed by the lower spindle bearings. The normal upper limit of spindle travel, with the ejector lever retracted, is shown in broken lines in Figure 1, there being provided a stop mechanism in the drill head (not shown) which prevents the tool ejector from contacting the bottom wall 12 of the head, thus to prevent accidental ejection of the tool when the spindle is retracted in normal usage.

The tool ejector, generally indicated at 31, is slidably mounted upon the chuck 30 and is actuated by engagement with an ejector or knockout arm generally indicated at 32, pivotally mounted upon the bottom wall 12 of the head and adapted to abut and actuate the ejector when the arm is in operating position as shown in Figures 2 and 6. As shown in Figure 1, the chuck 30 preferably is an integral part of the spindle 15 and constitutes a cylindrical body having a tapered bore 33 corresponding to the standard taper of the shank 34 of drill 35. The upper end of tool shank 34 is flattened to provide a key 36 establishing a driving engagement in the usual manner with a cross slot 37 formed in the chuck. Chuck 30 follows generally a standard design in which the tapered tool shank is engaged frictionally and can be used without a tool ejector in which case the tool may be disengaged by a tapered bar inserted through slot 37.

The ejector sleeve 31 is of two-piece construction slidably mounted upon the outside diameter of chuck 30 and constitutes a top section 40 and a skirt section 41. The top section includes a head 42 and counter-turned portion 43, which fits telescopically into the inside diameter of the skirt section 41, being secured by the set screws 44—44 (Figure 3) threaded through the skirt. The inner ends of the screws are seated in holes drilled partially through the counter-turned portion 43 of the top section, thus joining the two sections together as a unit.

Extending crosswise through the chuck cross slot 37, there is disposed an ejector bar 45 somewhat shorter than the inside diameter of skirt 43, having its opposite ends engaged in slots 46—46 cut into the counter-turned portion 42 of the top section 40 and enclosed by the skirt 41. Slot 37 is approximately twice the width of the ejector bar to permit the bar to move vertically in the slot in its tool ejecting movement. Beneath the ejector bar there is provided a preloaded coil spring 47 having its lower end seated upon a ring 48 which is locked to the chuck 30 by an expansible ring 49 engaged in a groove 50 cut into the outside diameter of the chuck.

Sleeve 41 includes a lower flange 51 in slidable engagement with the chuck 30, and top member 40 also is engaged slidably upon the chuck. The inside diameter of the skirt is sufficiently large to accommodate with operating clearance the coil spring 47. By engagement of the ejector bar 45 in the chuck slot 37 and in the slots 46 of member 40, the ejector assembly is slidably keyed with respect to the chuck.

The ejector may be assembled most conveniently upon the chuck by inserting the ejector bar 45 through slot 37, slipping spring 47 upon the lower end of the chuck before the chuck is mounted in the sleeve 10, followed by ring 48 and expansible ring 49. The spring is preloaded by forcing the expansible ring toward the ejector bar until the ring snaps into its groove 50, thus maintaining the spring under compression between the ring and bar with the bar seated against the upper end of slot 37. The upper and lower ejector sleeve portions are then applied over the spring and bar and locked together by installing the set screws 44—44. The skirt 41 thus provides a closure to protect the mechanism against chips and dirt and to lock the ejector bar laterally in its slot.

The ejector can also be installed conveniently upon an existing machine without demounting the chuck from its sleeve by slipping the parts sequentially upon the lower end of the chuck. In this procedure the top member 40 first is slipped upwardly from the lower end of the chuck, followed by bar 45, spring 47, ring 48 and expansible ring 49. The spring in this instance is preloaded by forcing the expansible ring upwardly until it snaps into engagement in its groove 50. After preloading the spring in this manner, the skirt section 41 is slipped in position from the lower end of the chuck and telescopically engaged upon the counter-turned portion 42 of the top section and secured by the said screws 44—44.

The ejector bar and sleeve assembly is maintained in the position shown in Figure 1 by the coil spring 47 whereby the assembly can be shifted downwardly relative to chuck 30 to bring the ejector bar into engagement with the key 36 of the drill and drive the tapered shank from the chuck bore. This operation is performed by elevating the spindle assembly with the ejector or knock-out arm 32 interposed between the head and ejector sleeve, so that the lever serves as a stop for the ejector sleeve. Continued movement of the spindle assembly after engagement of the ejector sleeve causes the key 36 of the drill to engage the ejector bar 45 while the chuck is drawn upwardly, thereby dislodging the drill shank from wedging engagement with the chuck socket.

As shown in Figure 6, the ejector arm 32 includes a crescent-shaped portion 52, having an inner radius 53 corresponding to the diameter of the spindle sleeve 10 so that in its operative position, the portion 52 closely embraces the sleeve. The arm is located with respect to the sleeve 10 on the side opposite to the rack teeth to avoid interference with the vertical translation of the sleeve but engageable with the ejector sleeve by reason of the difference in diameter. As shown in Figure 1, one end of the ejector lever is pivotally mounted upon the bottom 12 of the head by a shoulder screw 54 having its end screwthreaded into the head and including a shank 55, passing through the lever. A washer 56 is interposed between the head of the screw and lever.

The lower wall 12 of the head surrounding the spindle sleeve includes a machine finished slide bearing 57 for the ejector arm. The arm thus is backed up by the slide bearing so that there is very little strain imposed upon the shoulder screw 54, thus simplifying the structure. The swinging end of the arm is provided with a downwardly depending handle 58 for convenience in shifting it. The arm further is provided with a detent arranged to latch the arm selectively in operative or inoperative position. The detent constitutes a ball 59 maintained in a bore 60 drilled through the arm, the ball being pressed upwardly by a compression spring 61, the lower end of which is seated upon a plug 62 screwthreaded into the hole 60. The bearing surface 57 of the head is provided with a pair of concave recesses 63—63 (Figures 2 and 6) appropriately located to engage ball 59 to latch the arm in selected position to prevent accidental displacement. There is provided also a stop pin 64 projecting downwardly from the head in position to engage the block in its inoperative position.

When the ejector arm is shifted to inoperative position, the tool cannot be accidentally ejected because the spindle reaches its limit of travel before the ejector sleeve abuts the bottom of the drill head. The thickness of the ejector arm is such that it impedes the retracting movement of the ejector at the final limit of spindle travel, as shown in broken lines in Figure 1. The relative movement between the chuck and sleeve, caused by the arm (Figure 2), is ample to relieve completely the frictional engagement of the tapered tool shank in the chuck socket.

Having described our invention, we claim:

1. In a drill head having a vertically translatable cylindrical chuck extending downwardly from the bottom of the drill head, the chuck including an upwardly tapered bore extending from its lower end for frictionally engaging the shank of a tool, an ejector mechanism for dislodging the tool downwardly from the tapered bore, said ejector mechanism comprising; an ejector bar extending diametrically through the chuck, the ejector bar being located above the upper end of the shank of the tool and having a substantial vertical width, the chuck having a slot which is greater in width vertically than the vertical width of the ejector bar to provide downward movement thereof relative to the chuck upon upward translation of the chuck, the ejector bar having its opposite ends extending beyond the periphery of the chuck, a preloaded coil spring encircling the chuck having its upper end engaged against extended ends of the ejector bar, an expansible ring engaging the chuck below the ejector bar and providing a seat for the lower end of the coil spring with the spring under compression between the expansible ring and the ejector bar, a cylindrical sleeve constituting a head slidably engaging the chuck and a downwardly extending skirt, said skirt enclosing the coil spring and the expansible ring, an internal flange extending from the lower end of the skirt slidably engaging the chuck below the expansible ring, said head being slotted internally to receive the extended opposite ends of the ejector bar, the ejector bar and cylindrical sleeve being maintained in elevated position by the coil spring with the ejector bar above the upper end of the shank of the tool in a position to engage and eject the same downwardly, and an ejector arm pivotally mounted on the bottom of the drill head adjacent the chuck and adapted to be shifted transversely relative to the chuck, the arm having a portion adapted to partially surround the chuck when shifted to operating position and having a substantial thickness, the ejector arm being adapted upon being shifted to operative position to abut the upper end of the head of the cylindrical sleeve and shift the same downwardly when the chuck is translated upwardly and thereby to shift the cylindrical sleeve ejector and bar downwardly to cause ejection of the tool from said upwardly tapered bore.

2. In a drill head having a vertically translatable cylindrical chuck extending downwardly from the bottom of the drill head, the chuck including an upwardly tapered bore extending from its lower end for frictionally engaging the shank of a tool, an ejector mechanism for dislodging the tool downwardly from the tapered bore, said ejector mechanism comprising; an ejector bar extending diametrically through the chuck, the ejector bar being located above the upper end of the shank of the tool and having a substantial vertical width, the chuck having a slot which is greater in width vertically than the vertical width of the ejector bar to provide downward movement thereof relative to the chuck upon upward translation of the chuck, the ejector bar having its opposite ends extending beyond the periphery of the chuck, a preloaded coil spring encircling the chuck having its upper end engaged against extended ends of the ejector bar, an expansible ring engaging the chuck below the ejector bar and providing a seat for the lower end of the coil spring with the spring under compression between the expansible ring and the ejector bar, a cylindrical sleeve consisting of a separable head and skirt, the head being slidably engaged upon the chuck above the ejector bar and adapted to engage the extended opposite ends thereof, the skirt surrounding and being spaced outwardly from the periphery of the chuck and enclosing the coil spring and the expansion ring, an internal flange on the lower end of the skirt slidably engaging the chuck below the expansible ring, means securing the head to the skirt, and an ejector arm pivotally mounted on the bottom of the drill head adjacent the chuck and adapted to be shifted transversely relative to the chuck, the arm having a portion adapted to partially surround the chuck when shifted to operating position and having a substantial thickness, the ejector arm being adapted upon being shifted to operating position to abut the upper end of the head of the cylindrical sleeve and shift the same downwardly when the chuck is translated upwardly and thereby to shift the cylindrical sleeve ejector and bar downwardly to cause ejection of the tool from said upwardly tapered bore.

CARL E. LINDEN.
FRANK O. WETZEL.

REFERENCES CITED

The following references are of record in the file of this patent:

UNITED STATES PATENTS

| Number | Name | Date |
|---|---|---|
| 593,313 | Schultz | Nov. 9, 1897 |
| 940,301 | Carlborg | Nov. 16, 1909 |
| 1,296,133 | Stuart | Mar. 4, 1919 |
| 1,761,181 | Chace | June 3, 1930 |
| 2,205,664 | Mayer | June 25, 1940 |

FOREIGN PATENTS

| Number | Country | Date |
|---|---|---|
| 36,067 | Austria | Jan. 25, 1909 |
| 433,396 | France | Oct. 25, 1911 |
| 171,233 | Great Britain | Nov. 17, 1921 |
| 168,210 | Switzerland | Sept. 1, 1934 |